United States Patent [19]

Kinoshita et al.

[11] Patent Number: 5,320,769
[45] Date of Patent: Jun. 14, 1994

[54] MAGNETIC PAINT AND MAGNETIC RECORDING MEDIUM

[75] Inventors: Hiroshi Kinoshita, Osaka; Yasutaka Nakama, Hyogo; Goro Iwamura; Shigeru Komazaki, both of Osaka; Masataka Ooka, Osaka, all of Japan

[73] Assignee: Dainippon Ink and Chemicals, Inc., Tokyo, Japan

[21] Appl. No.: 863,242

[22] Filed: Apr. 3, 1992

[30] Foreign Application Priority Data

| Dec. 25, 1991 | [JP] | Japan | 3-343063 |
| Dec. 25, 1991 | [JP] | Japan | 3-343064 |
| Jan. 14, 1992 | [JP] | Japan | 4-4832 |
| Feb. 19, 1992 | [JP] | Japan | 4-31964 |
| Feb. 19, 1992 | [JP] | Japan | 4-31965 |

[51] Int. Cl.$^5$ .............................. G11B 5/702
[52] U.S. Cl. ................. 252/62.54; 427/128; 428/409; 428/425.9; 428/694; 428/695
[58] Field of Search ....................... 252/62.54

[56] References Cited

U.S. PATENT DOCUMENTS

| 4,286,022 | 8/1981 | Vermillion | 428/423.1 |
| 4,784,914 | 11/1988 | Matsufuji et al. | 252/62.54 |
| 4,798,755 | 1/1989 | Yamada et al. | 252/62.54 |
| 5,034,271 | 7/1991 | Miyoshi | 428/323 |
| 5,085,941 | 2/1992 | Onkubo | 252/62.54 |
| 5,118,580 | 6/1992 | Onkubo | 252/62.54 |
| 5,134,035 | 7/1992 | Kumar et al. | 252/62.54 |
| 5,178,953 | 1/1993 | Anglin | 252/62.54 |

Primary Examiner—Ellen M. McAvoy
Attorney, Agent, or Firm—Armstrong, Westerman, Hattori, McLeland & Naughton

[57] ABSTRACT

A magnetic paint and objects coated with same are disclosed, where the magnetic paint is characterized by comprising, as its essential components, a block copolymer and magnetic powder, said block copolymer having polyurethane and vinyl polymer segments. The magnetic paint of the present invention exhibits good dispersability of the magnetic powder, and good surface smoothness, durability, and wear resistance of the magnetic recording medium. Objects which may be appropriately coated with the magnetic paint of the present invention include high-quality magnetic recording media, such as magnetic tapes, magnetic cards, prepaid cards, magnetic disks and so on.

25 Claims, No Drawings

MAGNETIC PAINT AND MAGNETIC RECORDING MEDIUM

BACKGROUND OF THE INVENTION

1. Field of the Invention

The present invention relates to magnetic paint and objects coated the same, more particularly to magnetic paint comprising, as its essential components, a block copolymer and magnetic powder, the block copolymer having polyurethane and vinyl polymer segments, and objects coated the same.

The magnetic paint of the present invention exhibits outstanding effects as a magnetic recording medium for various purposes, including magnetic tapes, cards, prepaid cards and discs, and the objects coated with such magnetic paint can be used widely for the above purposes as a high-quality, magnetic recording medium.

2. Description of Related Art

Recently, demand has been increasing for audio tapes, home VTR tapes, magnetic tapes for computers, and floppy disks of higher quality, resulting from marked advances in hardware techniques for audiovisual devices, such as 8 mm videos, DATS, S-VHSs and high definition televisions, as well as computers, and the advent of higher-density recording media.

In particular, these recording media are required to be highly reliable during playback, and videotapes are required to reproduce high-quality images in addition to being highly reliable.

More concretely, they must have high-density recording ability in order to reproduce clear images and sound, to withstand high-speed movement for a long time under severe conditions, such as high temperature and high humidity, and to have sufficient adhesion between the magnetic layer and magnetic powder so that the latter will not come off from the former.

One of the important functions of the binder is to preserve these characteristics or properties of the magnetic layer. The binder is necessary to make the magnetic powder highly dispersable and to exhibit good electro magnetic characteristics, while maintaining high sensitivity, a high S/N ratio, a high CN ratio, and durability or resistant to wear and hydrothermal conditions.

A number of researchers have been developing various binders in an attempt to satisfy the above requirements. One of the major binders used to provide the magnetic layer with good wear-resistance and to improve the durability of the magnetic recording media is a blend of a vinyl chloride-vinyl acetate copolymer and a polyurethane resin.

However, several defects result depending on the extent of miscability between the vinyl chloride-vinyl acetate copolymer and the polyurethane resin. These defects include poor dispersability of the magnetic powder insufficient surface smoothness and low durability of the magnetic recording medium produced. At present, therefore, there are no binders with sufficient properties to achieve the above objectives, and objects coated with such magnetic paint are obviously unsatisfactory.

SUMMARY OF THE PRESENT INVENTION

The inventors of the present invention have conducted investigations to solve the above problems encountered in the prior art.

It is an object of the present invention to provide magnetic paint that improves the dispersability of magnetic powder, as well as the surface smoothness, durability and wear-resistance of the magnetic recording medium. It is another object of the present invention to provide objects coated with such a magnetic paint which can serve as a good magnetic recording medium.

The above objectives can be satisfied by the present invention which provides a magnetic paint and objects coated with the same, the magnetic paint comprising, as its essential components, a block copolymer with polyurethane and vinyl polymer segments and magnetic powder.

The block copolymer having polyurethane and block copolymer segments can be synthesized by various methods: the process wherein a vinyl copolymer having at least one functional group, at one or both ends, selected from the group consisting of hydroxide, isocyanate, mercapto, carboxyl, epoxy, amino and chlorocarbonyl, is reacted with polyurethane having, at one or both ends, a functional group which can react with the above functional group; the process wherein a vinyl copolymer having at least one functional group, at one or both ends, selected from a group consisting of hydroxide, isocyanate, mereapto, carboxyl, amino and chlorocarbonyl, is reacted with diol and diisocyanate compounds; the process in wherein a macromolecular azo compound is used as the polymerization initiator to polymerize at least one type of polymerizable, unsaturated monomer, where the azo compound is synthesized by reacting with an azo compound having, in its molecular structure, at least one azo group and at least one functional group selected from a group consisting of hydroxide, isocyanate, mercapto, carboxyl, epoxy, amino and chlorocarbonyl, with polyurethane having, at one or both ends, a functional group that can react with the above functional group; the process wherein a macromolecular azo compound is used as the polymerization initiator to polymerize at least one type of polymerizable, unsaturated monomer, where the azo compound is synthesized by reacting with an azo compound having, in its molecular structure, at least one azo group and at least one functional group selected from a group consisting of hydroxide, isocyanate, mercapto, carboxyl, amino and chlorocarbonyl, with diol and isocyanate compounds; the process in which polymeric peroxide is used as a polymerization initiator to polymerize at least one type of polymerizable, unsaturated monomer, where polymeric peroxide has at least one peroxygen group and at least two urethane bonds; the process wherein a polymer anion produced by the anionic polymerization is reacted with polyurethane having a group that can react with the polymer anion to form a bond; and the process wherein a polymer cation produced by the cationic polymerization is reacted with polyurethane having a group that can react with the polymer cation to form the bond.

The vinyl polymer which is useful for the present invention was at least one functional group, at one or both ends, selected from a group consisting of hydroxide, isocyanate, mercapto, carboxyl, epoxy, amino and chlorocarbonyl, and is synthesized by various methods: the process wherein at least one type of polymerizable, unsaturated monomer is polymerized in the presence of a polymerization initiator, which is on azo compound having an azo group, such as azobiscyanopropanol, azobiseyanopentanol, azobiscyanopentanoic acid, azobiscyanopentanoic acid chloride and 2,2'-azobis [N-(4-aminophenyl)-2-methylpropionamide], and its functional group, or an azocarboxylic azide compound derived from an azocarboxylic acid, such as azobiscyanopentanoic acid; the process wherein at least one type of polymerizable, unsaturated monomer is polymerized in the presence of a polymerization initiator which is an organic peroxide having a peroxygen group, such as 2,5-dimethyl-2,5-bis (hydroperoxy) hexane, and its functional group; the process wherein vinyl polymer anion is synthesized by anionic polymerization, and the functional group is introduced at its end by a termination reaction; the process wherein a vinyl polymer cation is synthesized by cationic polymerization and the functional group is introduced at its end by a termination reaction; and the process wherein a vinyl monomer is polymerized in the presence of a chain transfer agent of a mercaptan compound having a functional group such as the aforementioned hydroxide and carboxyl. Further, it is possible to synthesize the above vinyl polymer by reacting a bifunctional compound with the functional group at the end to change the functional group. For example, diisocyanate can be added to a vinyl polymer having a hydroxyl group at the end to replace the hydroxyl group, or glycidol can be added to a vinyl polymer having a carboxylic group at the end in order to replace the carboxylic acid. Thus, a variety of vinyl polymer types having a functional group at the end can be synthesized by these methods. However, the method for synthesizing such a vinyl polymer is not specified.

The macromolecular azo compound useful as a polymerization initiator for the present invention is synthesized by various methods: the process wherein azobiseyanopentanoic acid or azobiscyanopentanoic acid chloride is reacted with polyurethane diol; the process wherein azodiisocyanate, synthesized by decomposition at low temperature of azocarboxylic acid azide derived from azobiscyanopentanoic acid, is reacted with polyurethane diol; the process wherein an azobisalcohol, such as azobiscyanopropanol or azobiscyano (n-pentanol), is reacted with polyurethane diisocyanate; and the process wherein an azo compound having an azo group, such as 2,2′-azobis [N-(4-aminophenyl)-2-methylpropione amide], and an amino group, is reacted with polyurethane diisocyanate. However, the method used to synthesize such a macromolecular azo compound is not specified. Furthermore, it is possible to synthesize such a compound by reacting a compound having an azo group, such as 2,2′-azobis [N-(4-aminophenyl)-2-methylpropione amide], and an amino group with a diol and a diisocyanate compound. Any method can be used, so long as it gives polyurethane having an azo group as the final product.

The polymeric peroxide useful for the present invention is synthesize by various methods: the process wherein peroxide having a chlorocarbonyl group at both ends, and synthesized, for example, by reacting 1 mot of 2,5-dimethyl-2,5-bis (hydroperoxy) hexane and 2 mols of dichloride adipate, is reacted with polyurethane diol; and the process wherein 2 mols of polyurethane diol are reacted with 1 mol of dichloride adipate, this product then being reacted with sodium peroxide. However, the method used to synthesize such a polymeric peroxide is not specified. Furthermore, it is possible to synthesize such a compound by reacting a compound having a hydroxyl group, such as 2,5-dimethyl-2,5-bis (hydroperoxy) hexane, and a peroxygen group of hydrogen peroxide with a diol and a diisocyanate compound. Any method can be used, so long as it gives polyurethane having a peroxygen group as the final product.

It is also possible to synthesize such a compound by reacting polyurethane having a group which can react with an anion, such as polyurethane diepoxide, polyurethane dicarboxylic chloride, or polyurethane diisocyanate, to from the bond with the vinyl polymer anion produced by the anionic polymerization of a polymerizable, unsaturated monomer in the presence of an alkaline metal, alkyl alkali, Grignard reagent or an alcoholate as the polymerization initiator.

It is also possible to synthesize such a compound by reacting polyurethane having a group which can terminate a cation, such as polyurethane dicarboxylic sodium, with the vinyl polymer cation produced by the cationic polymerization of a polymerizable, unsaturated monomer in the presence of protonic acid, acid metal halide, organic metal compound or stable carbonium salt as the polymerization initiator. In order to disperse magnetic powder well in such a block copolymer, it is effective to introduce a sulfonic acid group, sulfonic acid salt, carboxylic group, carboxylic acid salt, phosphoric acid group, phosphoric acid salt, phosphorous acid, phosphorous acid salt, hypophosphite group or hypophosphite acid salt into the block copolymer molecules. The above can be introduced into the polyurethane segment by the use of a compound having the aforementioned functional group and hydroxyl group, and into the vinyl polymer segment by the use of a monomer having the aforementioned functional group and polymerizable, unsaturated group. Such a functional group can be introduced into either the polyurethane or vinyl polymer segment, and preferably into both.

As one example, the method which uses a macromolecular azo compound as a polymerization initiator is described in more detail: A block copolymer including both polyurethane and vinyl polymer segments can be produced by polymerizing at least one type of polymerizable, unsaturated monomer in the presence of a compound which has at least one structural unit represented by the general formula:

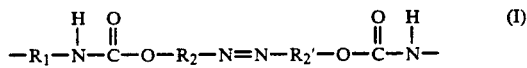

$$-R_1-\underset{\underset{H}{|}}{N}-\underset{\underset{O}{\|}}{C}-O-R_2-N=N-R_2{'}-O-\underset{\underset{O}{\|}}{C}-\underset{\underset{H}{|}}{N}- \quad (I)$$

where, $R_1$ stands for an alkylene group, a cyclic alkylene group, an alkylene group having an ester group, a benzene ring or an alkylene group containing a benzene ring, and $R_2$ and $R_2{'}$, which may be the same or different, for an alkylene group, an alkylene group containing a cyano group, an alkylene group containing an amide bond or an alkylene group containing an amide bond and a hydroxyl group, and a structural unit represented by the general formula:

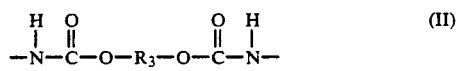

$$-\underset{\underset{H}{|}}{N}-\underset{\underset{O}{\|}}{C}-O-R_3-O-\underset{\underset{O}{\|}}{C}-\underset{\underset{H}{|}}{N}- \quad (II)$$

where, $R_3$ stands for polyol group residue.

The so-called macromolecular azo compound useful for the present invention as a polymerization initiator having the aforementioned urethane bond and azo group in the molecular structure has the specific structural units represented by formulae (I) and (II). Such a polyurethane-type macromolecular azo initiator is produced by reacting a compound having at least one azo group and at least two hydroxyl groups in the molecular structure with a poly isocyanate compound and polyol compound, the former compound having an azo group and hydroxyl group including an azobis alcohol compound, such as azobiscyanopropanol, azobiseyano-n-butanol, azobisisobutanol or azobiseyanopentanol, and azoamide polyol, such as "VA-080, VA-082 and VA-086," supplied by Wako Pure Chemical Industries, Ltd. Its molecular weight is not limited, but preferably has a number average molecular weight in a range of 1,500 to 50,000, in consideration of its use as a magnetic paint.

In other words, the polyurethane type macromolecular azo compound useful for the present invention as the polymerization initiator is produced by addition/condensation reactions of three types of compounds: polyisocyanate compound, polyol compound, and the compound having, as described earlier, at least one azo group and at least two hydroxyl groups.

The first compound includes a variety of diisocyanates, such as isophoronediisocyanate, methylcyclohexane-2,4-diisocyanate, methylcyclohexane-2,6-diisocyanate, 4,4'-methylenebis (cyclohexylisocyanate), 1,3-di (isocyanatemethyl) cyclohexane, tetramethylene diisocyanate, hexamethylene diisocyanate, trimethylcyclohexane diisocyanate, trilene diisocyanate and xylene diisocyanate and polyisocyanates, such as adducts by the above diisocyanates and polyalcohols, for example glycerin, trimethylol ethane, trimethylol propane, pentaerythritol, and dipentaerythritol or polyester compounds having a functional group that can react with the isocyanate group and has a very low molecular weight (for example, a number-average average molecular weight of around 500 to 1,500).

The second compound includes a variety of diols, polyols, bisphenol A and polyester polyols, such as ethylene glycol, diethylene glycol, propylene glycol, dipropylene glycol, 1,4-butane diol, 1,3-butane diol, 1,6-hexane diol, 3-methyl-1.5-pentadiol, neopentyl glycol, cyclohexane dimethanol, 2,2-diethyl-1, 3-propane diol, 2-ethyl-2-butyl-1,3-propane diol, 2-ethyl-1,3-hexane diol, 2,2-dimethyl-3-hydroxypropyl-2, 2-dimethyl-3-hydroxypropionate, 12-hydroxystearyl alcohol, polyethylene glycol, polypropylen glycol, polyhexamethylene glycol, trimethylol ethane, trimethylol propane, glycerin, pentaerithritol, and hydrogenated bisphenol A, or polyester polyol.

The number-average molecular weight of such a diol or polyol compound is not particularly limited, but is preferably 1,500 or lower, and more preferably 1,000 or lower, in consideration of its reactivity.

The polyester polyol compounds useful for the present invention include, but are not limited to, polyester resin (including oil-modified type) having a hydroxyl group, prepared by dehydration/condensation reactions between a variety of the diol/polyol compounds described earlier and a variety of dicarboxylic/polycarboxylic compounds, such as isophthalic acid, terephthalic acid, phthalate anhydride, tetrahydrophthalate anhydride, hexahydrophthalate anhydride, anhydrotrimellitic acid, pyromellitic acid, fumaric acid, maleic acid, succinic acid and adipic acid; and/or polyester resin having a hydroxyl group, prepared by the ring-opening/polymerization of a lactone compound, such as ε-caprolactone and valerolactone. These compounds are only representative ones prepared by known processes.

One or more of the following compounds may be used to improve the dispersability of the magnetic recording medium: diol having a carboxylic group or a carboxylic acid salt, such as dimethylol propionic acid, sodium dimethylolpropionate, dimethylol propionic acid - tetramethyl ammonium salt; diol having a sulfonic acid group or a sulfonic acid salt, such as 2-sulfonate-1,4-butane diol, 1-sulfonate-1,4-butane diol, 3-sulfonate-2,5-dimethyl-3-hexene-2,5-diol, 2-sulfosodium-1,4-butane diol, 1-sulfosodium-1,4-butane diol, 3-sulfosodium-2,5-dimethyl-3-hexene-2,5-diol, 2,5-disulfopotassium-3,4-hexane diol and 3-sulfopotassium-1,5-pentadiol; and diol having a phosphate group or a phosphate acid salt, such as 2-phosphate-1,4-butan diol and 2-sodium phosphate-1,4-butane diol.

The macromolecular azo compound useful as the polymerization initiator for the present invention can be synthesized by various methods: the process wherein the above three types of compounds are charged simultaneously in a reactor to allow them to react with each other; and the process wherein a polyurethane intermediate having an isocyanate group, i.e., a so-called urethane prepolymer, is prepared first, is related with a compound having at least one azo group and at least two hydroxyl groups in the molecular structure. The method is not particularly limited, and can be selected from known processes.

Of course, that one or more of a variety of polyamine compounds may be used as the chain-extending agent for the reactions between the diol or polyol compound and the diisocyanate or polyisocyanate compound, the polyamine compound useful for the present invention including ethylene diamine, hexamethylene dimanine, triethylene tetramine, tetraethylene pentamine, bisaminopropyl amine and 4-aminomethyl-1,8-diaminooctane.

At least one type of the polymerizable, unsaturated monomer useful for the present invention includes an aromatic-base vinyl monomer, such as styrne, α-methyl styrene, p-t-butyl styrene and vinyl toluene; (meth) acrylate, such as methyl (meth)acrylate ethyl (meth) acrylate, n-propyl (meth)acrylate, i-propyl (meth) acrylate, n-butyl (meth)acrylate, i-butyl (meth) acrylate, t-butyl (meth)acrylate, 2-ethylhexyl (meth) acrylate, lauryl (meth)acrylate, cyclohexyl (meth) acrylate, benzyl (meth)acrylate, dibromopropyl (meth) acrylate, tribromophenyl (meth)acrylate and alkoxyalkyl (meth)acrylate; diester of unsaturated dicarboxylic acid and monovalent alcohol, such as maleic acid, fumaric acid and itaconic acid; vinyl ester, such as vinyl acetate, vinyl benzoate and Veova (vinyl ester supplied by Netherlands' Shell); vinyl ester having a (per) fluoroalkyl group, such as Viscoat 8F, 8FM, 17FM, 3F and 3FM (fluorine-containing acrylic monomers, supplied by Osaka Yuki Kagaku), perfluorocyclohexyl (meth)acrylate, diperfluorocyclohexyl fumarate and N-i-propyl-perfluorooctane sulfone amideethyl (meth)acrylate fluorine-containing, polymerizable compounds, such as vinyl ethers, (meth)acrylate, unsaturated polycarboxylic esters; vinyl-base monomer having no olefinic functional group, such as (meth)acrylonitrile, vinyl chloride, vinilydene chloride, vinyl fluoride and vinilyden fluoride; a vinyl-base monomer having an amide bond, such as (metha) acrylamide, dimethyl (meth) acrylamide, N-t-butyl (metha) acrylamide, N-octyl (meth) acrylamide, diacetone acrylamide, dimethylaminopropyl acrylamide, and alkoxyl N-metylol (meth)acrylamide; dialkyl [(meth)acryloyloxyalkyl] phosphates, (meth)

acryloyloxyalkyl acid phosphate, dialkyl [(meth) acryloyloxyalkyl] phosphite, and an alkylene oxide adduct of the aforementioned (meth)acryloyloxyalkyl acid phosphate or (meth)acryloyloxyalkyl acid phosphite; alkylene oxided Adducts of the aforementioned (meth)acryloyloxy alkyl acid phosphates or acid phosphites; an ester compound of a vinyl-base monomer having an epoxy group, such as glycidyl (meth) acrylate and methylglycidyl (meth)acrylate, and phosphoric acid, phosphorous acid or an acid ester thereof; vinyl monomers having a phosphorus atom, such as 3-chloro-2-acid phosphoxypropyl (meth)acrylate; dialkylaminoalkyl (meth) acrylate, such as dimethylaminoethyl (meth)acrylate and diethylaminoethyl (meth)acrylate; a hydroxyalkyl ester of α,β-ethylene type unsaturated carboxylic acid, such as 2-hydroxyethyl (meth)acrylate, 2-hydroxypropyl (meth) acrylate, 3-hydroxypropyl (meth)acrylate, 2-hydroxybutyl (meth)acrylate, 3-hydroxybutyl (meth)acrylate, 4-hydroxybutyl (meth)acrylate, 3-chloro-2-hydroxypropyl (meth)acrylate, di-2-hydroxyethyl fumarate, mono-2-hydroxyethyl monobutyl fumarate, polypropylene glycol, polethylene glycol mono (meth)acrylate Placcel FM or FA monomer, caprolactone-added monomers supplied by Daicel Chemical Industries and an adduct of the above compound and ε-caprolacton; unsaturated monocarboxylic and dicarboxylic acids, such as (meth)acrylate acid, crotonic acid, maleic acid, fumaric acid, itaconic acid and citraconic acid; α,β-ethylene type unsaturated carboxylic acid, such as a monoester of the above dicarboxylic acid and a monovalent alcohol; adducts of a variety of unsaturated carboxylic acids and monoglycidyl ester or butyl glycidyl ether of a monovalent carboxylic acid and a monoepoxy compound or the adduct of polycarboxylic anhydride of these compounds and ε-caprolactone, the unsaturated carboxylic acid including an adduct of the aforementioned α,β-ethylene-type unsaturated carboxylic hydroxyalkyl ester and maleic acid, succinic acid, futaric acid, hexahydrofutaric acid, tetrahydrofutaric acid, benzene tricarboxylic acid, benzentetracarboxylic acid, Himic acid, supplied by Hitachi Chemical, tetrachlorofutaric acid and dodecinyl suceinic acid, the monoglycidyl ester and butyl glycidyl ether including Cardura E, glycidyl ester of branched, synthetic resin fatty acid, supplied by Shell, coconut oil fatty acid glycidyl ester and octyl acid glycidyl esther, and the monoepoxy compound including ethylene oxide and propylene oxide; monomers having a hydroxyl group, such as hydroxyvinyl ether; monomers having a carboxylic group, such as an adduct of an α,β-unsaturated, carboxylic acid hydroalkyl ester and polycarboxylate anhydride, the α,β-unsaturated, carboxylic acid hydroalkyl ester including 2-hydroxyethyl (meth)acrylate; 2-hydroxypropyl (meth) acrylate, 3-hydroxypropyl (meth)acrylate, 2-hydroxybutyl (meth)acrylate, 3-hydroxybutyl meth(acrylate hydroxybutyl (meth)acrylate, 3-chloro-2-hydroxypropyl (meth)acrylate, di-2-hydroxyethy-monobutyl fumarate and polyethylene glycol mono-2-hydroxyethy-monobutyl fumarate and polyethylene glycol mono (meth)acrylate, and the polybarboxylate anhydride including maleic acid, succinic acid, futaric acid, hexahydrofutaric acid, tetrahydrofutaric acid, benzene tricarboxylic acid, benzentetracarboxylic acid, Himic acid, tetrachlorofutaric acid and dodecinyl succinic acid; and a silicon-base, polimerizable monomer, such as vinylethoxysilane, α-methacryloxypropyl trimethoxypilane, trimethylsiloxyethyl (meth)acrylate, and KR215 and X-22-5002, supplied by Shin-Etsu-Chemical.

The dispersability of a magnetic recording medium can be improved by utilization of a monomer including least one functional and group selected from a group consisting of sulfonic, a sulfonic acid salt, carboxylic, a carboxylic acid salt, phosphoric, a phosphoric acid salt, phosphorous, a phosphorous acid salt, hypophosphite and a hypophosphite acid salt, these compounds including the aforementioned monomer having a carboxylic group and its salt; parastyrene sulfonic acid, 2-acryloamide-2-methylpropane sulfonic acid, ethyl sulfonate (meth)acrylate and their salts; and the aforementioned monomer having phosphoric group and its salt.

The aforementioned salt includes: alkali metal salts such as those of sodium or potassium; amine salts such as those of trimethyl amine, triethyl amine, N-methyl morpholine, ammonia, monoalkyl amines (such as monomethyl amine or monobutyl amine), alicyclic amines (such as morpholine), or aromatic amines (such as aniline or toluidine); or quaternary ammonium salts such as those prepared by a reaction of tetraalkyl ammonium halide or tetra-alkylammonium hydroxide.

These block copolymers containing a base may be made basic during the process wherein the macromolecular azo compound as the polymerization initiator is synthesized with the aid of a base-containing compound, during the process wherein the block copolymer is synthesized with the aid of a base-containing monomer, and during or after the process wherein the macromolecular azo compound as the polymerization initiator or block copolymer is synthesized. The method for making the copolymer basic is not specified.

The polymerization to produce the block copolymer using each of the aforementioned starting materials is effected by known processes. Of course the copolymerization process may be effected in the presence of a radical-generating polymerization catalyst, selected from a variety of compounds, such as azobisisobutylonitrile (AIBN), benzoyl peroxide (BPO), t-butyl perbenzoate (TBPB), t-butyl hydroperoxide, di-t-butyl peroxide (DTBPO) and cumene hydroperoxide (CHP), either alone or in combination.

The polyurethane to be added, as necessary, to the magnetic paint of the present invention is produced by addition reactions between the aforementioned diisocyanate or polyisocyanate and oligodiol, oligopolyol, polymer diol or polymer polyol, such as the aforementioned low-molecular-weight diol compound, polyester diol, polyester polyol and polyether. One example is the compound produced by reactions between oligopolyester and tolylene diisocyanate, the oligopolyester including one having a molecular weight of around 600, produced by reactions between adipic acid or futaric acid and neopentyl glycol. The quantity of the polyurethane to be added to the magnetic paint of the present invention is not specified, although it is normally in a range from 0 to 500 parts per 100 parts of the block copolymer components, and, in particular, in the preferable range of from 20 to 100 parts, in consideration of producing balanced properties. The magnetic paint of the present invention comprises, as its essential components, the block copolymer thus produced and magnetic powder. The magnetic powder is mixed with other components, as necessary, such as a coating solvent, hardening agent, dispersant, lubricant, abrasive and anti-static agent.

The magnetic powders useful for the present invention include, but are not limited to, γ-ferrite, cobalt γ-ferrite, barium-ferrite, and metallic iron and its alloys (the so-called metallic powders). Only the representative powders are described above. Examples of the coating solvents useful for the present invention include, but are not limited to, ketones, such as acetone, methylethylketone, methylisobutylketone, and cyclohexane; alcohols, such as methanol, ethanol, propanol and butanol; esters, such as ethyl acetate, butyl acetate and ethylene glycol monoacetate; ethers, such as ethylene glycol dimethyl ether, diethylene glycol dimethyl ether and dioxane; aromatic hydrocarbons, such as benzene, toluene and xylene; halogenated hydrocarbons, such as methylene chloride, carbon tetrachloride and chloroform; and non-protonic polar solvents, such as dimethyl formamide, dimethyl sulfoxide, sulfolane and N-methyl pyrrolidone. Only the representative solvents are described above. It is needless to say that the solvent used for the process to synthesize the block copolymer can be used for the above purpose.

The hardening agent which is to be used for the present invention is not specified. One of the most suitable hardening agents is of polyisocyanate. More concretely, those of polycyanate resin or the aforementioned diisocyanate compounds useful as the hardening agent for the present invention include Burnock D.-750 and Crisvon NX, both supplied by Dainippon Ink and Chemicals, Desmodur L., supplied by Sumitomo Bayer, Coronate L, supplied by Nippon Polyurethane, Takenate D-102, supplied by Takeda Chemical Industries, Burnock D-950, supplied by Dainippon Ink and Chemicals, and Desmodur R and Desmodur RF, both supplied by Sumitomo Bayer.

The ratio of the block copolymer to polyisocyanate is not specified, but is preferably in a range from 100:0 to 100:200 by weight, and more preferably from 100:3 to 100:40, in order to improve mechanical strength, resistance to wear, hydrothermal conditions and solvents, and resin-base adhesion of the hardened polyurethane.

The dispersant useful for the present invention includes, but is not limited to, fatty acid having from 12 to 18 carbon atoms, such as caprylic acid, capric acid, lauric acid, myristic acid, stearic acid, oleic acid, elaidic acid, linoleic acid and linolenic acid; metallic salt by the above fatty acid and alkaline or alkaline earth metal; and lecithin. Only representative dispersants are described above.

The lubricant useful for the present invention includes, but is not limited to, silicon oil, carbon black and graphite. Only representative lubricants are described above.

The abrasive useful for the present invention is not specified, so long as it is used normally. Concretely, representative abrasives include molten alumina, silicon carbide chromium oxide, diamond, artificial diamond and garnet.

The anti-static agents useful for the present invention include electrically conductive powders, such as those of graphite and carbon black; natural surface-active agents, such as saponin; nonionic surface-active agents, such as those based on alkylene oxide, glycerin and glycidol; cationic surface-active agents, such as higher alkyl amines, quaternary ammonium salts and sulfoniums; anionic surface-active agents, such as those containing a carboxylic, sulfonic, phosphoric, sulfuric ester or phosphoric ester group; and ampholitic surface-active agents, such as sulfate and phosphate esters of amino acids, aminosulfonic acids and aminoalcohols.

A commercial block copolymer may be used for the magnetic paint of the present invention, such copolymers including vinyl chloride - vinyl acetate copolymers, cellulose-base resins, vinyl chloride copolymers, polyvinyl butylal-base resins, thermosetting polyester resins, vinyl chloride - vinyl propionate copolymers, epoxy resins and phenoxy resins, all of which are normally used for a variety of other purposes.

The coated objects of the present invention are not specified. Some of the more important ones are polyesters, such as polyethylene terephthatate and polyethylene-2,6-naphthalate; polyolefins, such as polypropylene; cellulose derivatives, such as cellulose triacetate and cellulose diacetate; polycarbonate, polyimide, polyamideimide, polystyrene and acrylic resins; metals, such as Cu, Al and Zn; ceramic materials, such as glass, porcelain and pottery; and paper. The shape of the object is not limited. Some of the more important shapes include tapes, sheets, cards, disks and drums.

The coating method useful for the present invention is not limited. Some of the more important coating methods include air-doctor, bleeding, air-knife, squeezing, impregnation, reverse rolling, transfer rolling, gravure, kiss coating, casting and spray coating.

The block copolymer for the present invention, prepared by the methods described above, exhibits outstanding properties in pigment dispersion, resistance to hydrothermal conditions, resistance to wear, fluidity and permanent elongation, and as such has various uses in addition to its use as a binder for magnetic recording media.

Some prospective areas of application for the copolymer include various types of printing ink, magnetic rubber, paints, electrically conductive resins and adhesive agents.

PREFERRED EMBODIMENTS

The present invention is more concretely illustrated by the following REFERENCE EXAMPLES, EXAMPLES and COMPARATIVE EXAMPLES. Part(s) and percentages are on a weight basis, unless otherwise specified.

REFERENCE EXAMPLE 1

Preparation of a macromolecular azo compound as the polymerization initiator 1,500 parts of methylethylketone, 58 parts of azobiscyanopropanol and 0.2 parts of di-n-butyl tin dilaurate were charged in a four-necked flask, equipped with a thermometer, mechanical stirrer and reflux condenser, to which 546 parts of hexamethylene diisocyanate was added dropwise for 2 hours, while stirring and cooling with ice. The mixture was heated to 20° C., at which point it was maintained for 2 hours to sustain the reactions, and then cooled again with ice.

396 parts of dipropylene glycol were added to the above reaction mixture, and the mixture was heated to 30° C., at which point it was maintained for 10 hours to sustain the reactions. The polyurethane macromolecular azo compound thus prepared as the polymerization initiator had a number-average molecular weight of 20,500 as polystyrene, determined by gel permeation chromatography (GPC), a Gardner viscosity of $Z_I$ at 250° C. and a non-volatiles content of 40%.

In order to determine other properties of the azo compound, 5 parts of hydroquinone and 20 parts of n-butanol were added to 20 parts of the azo compound, and the mixture was decomposed at 100° C. for 10 hours.

The decomposition product had a number-average molecular weight of 3,200, from which it was judged that the target macromolecular azo compound as the polymerization initiator had an average of 6.4 azo groups in its unit molecular structure.

REFERENCE EXAMPLE 2

Preparation of macromolecular azo compound as the polymerization initiator 1,000 parts of methylethylketone, 500 parts of n-methyl pyrrolidone, 366 parts of dipropylene glycol, and 0.1 parts of dimethylol propionic acid and di-n-butyl tin dilaurate were charged in the same vessel as used for REFERENCE EXAMPLE 1, and the mixture was heated to 80° C., to which 546 parts of hexamethylene diisocyanate were added dropwise for 2 hours, and held for 5 hours to sustain the reactions.

The polyurethane macromolecular azo compound containing an isocyanate group had a number-average molecular weight of 3,700 as polystyrene, determined by GPC. GPC analysis was conducted after the isocyanate group was reacted with diethyl amine.

Next, 2,442 parts of the polyurethane having an isocyanate group were charged into the reactor, to which 58 parts of azobispropanol were added, and the mixture was heated to 30° C., at which point it was held for 10 hours to sustain the reactions.

The polyurethane-type macromolecular azo compound as the polymerization initiator and the decomposition product had number-average molecular weights of 18,000 and 3,000, respectively, from which it was judged that the azo compound had an average of 6.0 azo groups in its unit molecular structure.

The target macromolecular azo compound had a non-volatiles content of 40% and a Gardner viscosity of Y-Z at 25° C.

REFERENCE EXAMPLE 3

Preparation of a macromolecular azo compound as the polymerization initiator 614 parts of adipic acid, 438 parts of neopentyl glycol and 698 parts of isophthalic acid were charged in the reactor vessel, equipped with a thermometer, mechanical stirrer and air condenser. They were allowed to react at 140° C. for 1 hour, and then heated slowly to 220° C. for 2 hours, at which point they were further allowed to react for 6 hours, to produce polyester resin, having an acid number of 2, a hydroxyl group number of 78 and a number-average molecular weight of 1,400.

Next, 797 parts of the above polyester resin, 55 parts of azobiseyanopropanol, 0.2 parts of di-n-butyl tin dilaurate and 1,500 parts of methylethylketone were charged in the same reaction vessel as used in REFERENCE EXAMPLE 1, to which 148 parts of tolylene diisocyanate were added dropwise for 2 hours, while cooling with ice.

The mixture was heated to 30° C., at which point it was maintained for 10 hours to sustain the reactions. As a result, the target polyurethane-type macromolecular azo compound as the polymerization initiator was produced, which has a number-average molecular weight of 22,000, a Gardner viscosity of W-X at 25° C. and a non-volatiles content of 40%.

5 parts of hydroquinone and 20 parts of n-butanol were added to 20 parts of the azo compound, and the mixture was decomposed at 100° C. for 10 hours. The decomposition product had a number-average molecular weight of 3,300, from which it was judged that the target macromolecular azo compound as the polymerization initiator had an average of 6.7 azo groups in its molecular structure.

REFERENCE EXAMPLES 4 AND 5

Preparation of macromolecular azo compound as the polymerization initiator

The same procedure as used in REFERENCE EXAMPLE 1 was repeated, except that the solvents, azo alcohol, polyol and polyisocyanate compounds given in Table 1 were used, and the operating conditions also given in Table 1 were used, to produce the target polyurethane-type macromolecular azo compounds as polymerization initiators.

Their properties are given in Table 1.

REFERENCE EXAMPLE 6

150 parts of toluene, 50 parts of dimethyl formamide and 500 parts of cyclohexanone were charged in a four-necked flask, equipped with a thermometer, mechanical stirrer and reflux condenser, and heated to 80° C., to which a mixture of 180 parts of styrene, 550 parts of methyl methacrylate, 50 parts of 2-hydroxyethyl methacrylate, 20 parts of 2-acrylamide-2-methylpropane sulfonate and 500 parts of the polyurethane-type macromolecular azo compound as the polymerization initiator, prepared in REFERENCE EXAMPLE 1, was added dropwise for 4 hours. The mixture was maintained at the same temperature for 10 hours to sustain the polymerization reactions. As a result, a polyurethane/acrylic block compolymer solution was produced which had a number-average molecular weight of 22,000, a non-volatiles content of 50% and a Gardner viscosity of Y at 25° C.

REFERENCE EXAMPLES 7 THROUGH 13

The same procedure as used in REFERENCE EXAMPLE 1 was repeated, except that the polymerization solvents, polymerization initiators, monomers having polymerizable unsaturated bonds, and polymerization conditions given in Table 2 were used to produce the block copolymers.

REFERENCE EXAMPLE 14

150 parts of toluene, 50 parts of dimethyl formamide and 500 parts of methylethylketone were charged in a four-necked flask, equipped with a thermometer, mechanical stirrer and reflux condenser, and heated to 80° C., to which a mixture of 550 parts of methyl methacrylate, 180 parts of t-butyl methacrylate, 50 parts of 2-hydroxyethyl methacrylate, 20 parts of 2-acrylamide-2-methylpropane sulfonate, and 500 parts of the polyurethane-type macromolecular azo compound as the polymerization initiator, prepared in REFERENCE EXAMPLE 1, were added dropwise for 4 hours. The mixture was held at the same temperature for 10 hours to sustain the polymerization reactions. Then, 10.6 parts of tetramethyl ammonium hydroxide were reacted with the above mixture to convert the sulfonate group into quaternary ammonium salt, and the separated salt was removed by filtration. As a result, a polyurethane/acrylic block copolymer solution was produced which had a number-average molecular weight of 23,000, a non-volatiles content of 50% and a Gardner viscosity of Y-Z at 25° C.

REFERENCE EXAMPLE 15

1,218 parts of adipic acid and 720 parts of 1,4-butylene glycol were charged in a reaction vessel equipped with a thermometer, mechanical stirrer and air condenser. They were allowed to react at 140° C. for 1 hour, and then heated slowly to 220° C. for 2 hours, at which point they were further allowed to react for 6 hours to produce a polyester resin with an acid number of 2 and a hydroxyl group number of 59.

Next, 021 parts of the above polyester resin, 6,000 parts of cyclohexanone, 400 parts of dimethyl formamide and 79 parts of tolylene diisocyanate were allowed to react at 80°.C. for 10 hours. The polyurethane resin thus produced had a number-average molecular weight of 30,000.

REFERENCE EXAMPLE 16

522 parts of adipic acid, 498 parts of isophthalic acid, 664 parts of terephthalic acid, 186 parts of ethylene glycol, 416 parts of neopentyl glycol and 300 parts of 1,4-butylene glycol were charged in the same reaction vessel as used in REFERENCE EXAMPLE 13. They were allowed to react at 140° C. for 1 hour, and then heated slowly to 220° C. for 2 hours, at which point they were further allowed to react for 6 hours to produce a polyester resin having an acid number of 3 and a hydroxyl group number of 45.

Next, 939 parts of the above polyester resin, 600 parts of methylethylketone, 400 parts of dimethyl formamide and 61 parts of tolylene diisocyanate were allowed to react at 80° C. for 10 hours. The polyurethane resin thus produced had a number-average molecular weight of 31,500.

REFERENCE EXAMPLE 17

Synthesis of Polyurethane diisocyanate 464 parts of 2-butyl-2-ethyl-1, 3-propane diol, 1,000 parts of cyclohexanone and 0.3 parts of dibutyl tin dioctate were charged in a four-necked flask equipped with a thermometer, mechanical stirrer and reflux condenser, to which 536 parts of hexamethylene diisocyanate were added slowly dropwise. The mixture was heated to 80° C., at which point the mixture was maintained for 10 hours to sustain the reactions. The resin produced was polyurethane diisocyanate, having an isocyanate group quantity of 0.48 mmol/g (as solids), a non-votalites content of 50% and a number-average molecular weight of 4200.

REFERENCE EXAMPLE 18

Synthesis of Polyurethane Sodium dicarboxylate 644 parts of PTMG 650 (polytetramethylene glycol (molecular weight: 650), supplied by Sanyo Kasei), 26 parts of neopentyl glycol, 1,000 parts of methylethylketone and 0.3 parts of dibutyl tin dioctate were charged in a four-necked flask, equipped with a thermometer, mechanical stirrer and reflux condenser, to which 330 parts of isophorone diisocyanate were added slowly dropwise while heating to 80° C., at which point the mixture was held for 10 hours to sustain the reactions. 34 parts of glycolic acid were added to the above mixture to produce further reactions for 5 hours. The resin produced was a polyurethane carboxylate, having a carboxylic group quantity of 0.44 mmol/g (as solids) and a number-average molecular weight of 4,500. The polyurethane carboxylate solution was neutralized with 0.018 parts of sodium hydroxide, concentrated by distillation under a vacuum, and dried under a vacuum, to produce polyurethane sodium carboxylate.

REFERENCE EXAMPLE 19

Synthesis of Polyurethane Diol 341 parts of 1,6-hexane diol, 19 parts of dimethylol propionic acid, 0.3 parts of dibutyl tin dioctate, and 1,000 parts of methylethylketone were charged in a four-necked flask equipped with a thermometer, mechanical stirrer and reflux condenser, to which 640 parts of isophorone diisocyanate were added slowly while heating to 80° C., at which point the mixture was maintained for 15 hours to sustain the reactions. The mixture was then distilled under a vacuum to remove the solvent and concentrate the solution, and was further dried under a vacuum. As a result, polyurethane diol was produced which had a hydroxyl group quantity of 0.95 mmol/g (as solids) as a number-average molecular weight of 2,100.

REFERENCE EXAMPLE 20

Synthesis of Block Copolymer 400 parts of toluene and 100 parts of cyclohexanone were charged in a four-necked flask equipped with a thermometer, mechanical stirrer and reflux condenser and heated to 80° C., to which a mixture of 250 parts of styrene, 295 parts of methyl methacrylate, 5 parts of 2-acrylamide-2-methylpropane sulfonate and 25 parts of 2,2'-azobis (2-cyanopropanol) was added dropwise for 4 hours. The mixture was held at the same temperature for 10 hours to sustain the polymerization reactions. Then, 100 parts of the polyurethane diisocyanate solution, prepared in REFERENCE EXAMPLE 1, were added to produce a polyurethane/acrylic block copolymer having a number-average molecular weight of 21,000, a non-volatiles content of 50% and a Gardner viscosity of U-V at 25° C.

REFERENCE EXAMPLE 21

Synthesis of Block Copolymer 76 parts of azobiscyanopentanoic acid chloride and 200 parts of chloroform were charged in a four-necked flask equipped with a thermometer, mechanical stirrer and reflux condenser, and cooled with ice, to which 1,000 parts of polyurethane diol, prepared by REFERENCE EXAMPLE 3, 1,000 parts of chloroform and 50 parts triethyl amine were added. The mixture was heated to 35° C., at which point it was maintained for 2 hours to sustain the reactions. The mixture was then washed with ion-exchanged water to remove the hydrochloric acid salt of triethyl amine and dried under a vacuum to produce a macromolecular azo compound as the polymerization initiator.

400 parts of toluene and 100 parts of dimethyl formamide were charged in a four-necked flask equipped with a thermometer, mechanical stirrer and reflux condenser, and heated to 80° C., to which a mixture of 190 parts of styrene, 50 parts of methyl methacrylate, 50 parts of 2-hydroxyethyl methacrylate and 10 parts of 2-acrylamide-2-methylpropane sulfonate, 500 parts of the above macromolecular azo compound as the polymerization initiator and 300 parts of cyclohexanone was added dropwise for 4 hours. The mixture was maintained at the same temperature for 20 hours to sustain the polymerization reactions. As a result, a polyurethane/acrylic block copolymer was produced which had a number-average molecular weight of 18,500, a non-volatiles content of 50% and a Gardner viscosity of W-X at 25° C.

REFERENCE EXAMPLE 22

Synthesis of Block Copolymer 53 parts of 2,5-dimethyl-2,5-dihydroperoxyhexane, 0.5 parts of dibutyl tin dilaurate and 600 parts of cyclohexanone were charged in a four-necked flask equipped with a thermometer, mechanical stirrer and reflux condenser, and cooled with ice, to which 549 parts of hexamethylene diisocyanate were added. The mixture was heated to 25° C., at which point it was held for 3 hours to sustain the reactions. A mixture of 398 parts of dipropylene glycol and 400 parts of cyclohexanone was added to the above mixture to produce polymeric peroxide, which had a number-average molecular weight of 18,000, a non-volatiles content of 50% and a Gardner viscosity of Z at 25° C.

400 parts of toluene and 100 parts of cyclohexanone were charged in a four-necked flask equipped with a thermometer, mechanical stirrer and reflux condenser, and heated to 90° C., to which a mixture of 200 parts of styrene, 100 parts of methyl methacrylate, 85 parts of n-butyl methacrylate, 15 parts of 2-acrylamide-2-methylpropane sulfonate and 1,000 parts of the above polymeric peroxide solution was added dropwise for 4 hours. The mixture was held at the same temperature for 20 hours to sustain the polymerization reactions. As a result, a polyurethane/acrylic block copolymer was produced which had a number-average molecular weight of 25,000, a non-volatiles content of 50% and a Gardner viscosity of $Z_1$ at 25° C.

REFERENCE EXAMPLE 23

Synthesis of Block Copolymer 500 parts of polyurethane diisocyanate, prepared by REFERENCE EXAMPLE 1, 8.9 parts of glycidol and 8.9 parts of cyclohexanone were charged in a four-necked flask, equipped with a thermometer, mechanical stirrer and reflux condenser, and the mixture was heated to 80° C., at which point it was held for 5 hours to sustain the reactions. Then, the resin was allowed to settle in hexane to remove the solvent and dried under a vacuum. The resin thus produced was polyurethane epoxide, having an epoxy group quantity of 0.48 mmol/g (as solids) and a number-average molecular weight of 4,300.

A three-necked flask equipped with a thermometer, air-tight mechanical stirrer and three-way cock at the top was dried at 100° C. and 0.5 mmHg, and filled with purified nitrogen to return its internal pressure to atmospheric conditions. Then, 300 parts of dehydrated, purified benzene and 100 parts of methyl methacrylate were charged in the above treated flask through a funnel, to which 1.5 parts of the n-butyl lithium were added while stirring and allowed to react for 2 hours. 50.5 parts of the polyurethane diepoxide prepared above and 300 parts of purified tetrahydrofuran were added to the above mixture through a funnel while stirring for 2 hours. The mixture solution was settled in methanol and dried to produce a polyurethane/resin block copolymer having a number-average molecular weight of 25,000.

REFERENCE EXAMPLE 24

Synthesis of Block Copolymer

A three-necked flask equipped with a thermometer, air-tight mechanical stirrer and three-way cock at the top was dried at 100° C. and 0.5 mmHg, and filled with purified nitrogen to return its internal pressure to atmospheric conditions. Then, 300 parts of dehydrated, purified methylene chloride, 0.59 parts of ethylene glycol and 104 parts of styrene were charged in the above treated flask through a funnel, and the mixture was cooled to −78° C. by a dry-ice/methanol bath. 1.3 parts of boron trifluoride were added to the above mixture while stirring and allowed to react for 3 hours. 172 parts of polyurethane sodium dicarboxylate, prepared by REFERENCE EXAMPLE 2, and 200 parts of purified methylene chloride were added through a funnel, and the mixture was stirred for 2 hours. The mixture solution was settled in methanol, washed with ion-exchanged water and dried to produce a polyurethanel/polystyrene block copolymer, having a number-average molecular weight of 16,000.

EXAMPLE 1

A mixture of 100 parts of the block copolymer, prepared by REFERENCE EXAMPLE 6, 738 parts of methylethylketone, 250 parts of magnetic powder of Fe-Ni alloy, 8.6 parts of carbon black and 3.5 parts of lubricant were milled in a ball mill for 48 hours. Then 14.3 parts of Burnock D-750" (low-molecular-weight polyisocyanate, supplied by Dainippon Ink) were added and milled for 1 hour. The mixture was coated on a 10 μm substrate film of polyethylene terephthalate to a thickness of 8 μm (dry basis). The coated film was dried and calender-treated, and cut to a given width to produce the magnetic recording tape.

The magnetic recording tape thus produced was tested for the items described below to assess its quality.

Brightness of the Magnetic Tape

Prior to calender-treating, the magnetic surface of each tape was analyzed by a digital declinometer at an incidence angle of 45° and reflection angle of 45°.

Resistance of the Magnetic Tape to Hydrothermal Conditions

Each magnetic tape thus produced was maintained under conditions of 70° C. and 95% RH for 2 weeks, allowed to stand at normal temperature for 24 hours, and tested by a videotape recorder for its movement on the recorder. It was assessed by the following 3 ratings:

A: No problem was observed with the movement on the recorder.
B: Slightly irregular movement was observed.
C: Movement stopped on account of excessive adhesion of the tape.

Resistance of the Magnetic Tape to Wear

The magnetic surface of each magnetic tape thus produced was analyzed by a Taber type wear tester to determine the number of cycles before the magnetic layer came off.

Surface Smoothness of the Magnetic Tape

Surface smoothness was determined by visual inspection.

EXAMPLES 2 through 16, and COMPARATIVE EXAMPLES 1 and 2

The same analytical procedure as used in EXAMPLE 1 was repeated for magnetic tape of different compositions, as shown in Table 3 (1), (2) and (3), to assess their qualities.

As illustrated in Table 3 (1), (2), (3) and (4), the magnetic paint of the present invention comprising, as its essential components, the copolymer and magnetic powder thus prepared, is characterized by good dispersability of the magnetic powder, and much improved surface smoothness, durability and wear resistance of the magnetic recording medium. The present invention, therefore, provides highly practical magnetic paint and objects coated with same.

TABLE 1

| | REFERENCE EXAMPLES | | | | |
|---|---|---|---|---|---|
| | 1 | 2 | 3 | 4 | 5 |
| methylethylketone | 1500 | 1000 | 1500 | 1000 | 1200 |
| n-methylpyrrolidone | | 500 | | 500 | |
| azobiscyanopropanol | 58 | 58 | 55 | 41 | 70 |
| dipropylene glycol | 396 | 366 | | | |
| ethylene glycol | | | | | 202 |
| butylethylpropane diol | | | | 379 | |
| polyester resin, prepared by REFERENCE EXAMPLE 3 | | | 797 | | |
| dimethylol propionic acid | | 30 | | | |
| 2-sulfosodium-1, 4-butane diol | | | | 29 | |
| di-n-butyl tin dilaurate | 0.2 | 0.1 | 0.2 | 0.2 | 0.2 |
| hexamethylene diisocyanate | 546 | 546 | | | |
| isphorone diisocyanate | | | | 551 | 728 |
| tolylene diisocyanate | | | 148 | | |
| Properties | | | | | |
| non-volatiles (%) | 40 | 40 | 40 | 40 | 40 |
| viscosity (Gardner) | Z1 | Y-Z | W-X | V | X |
| number-average molecular weight | 20500 | 18000 | 22000 | 18000 | 11500 |
| quantity (number) of diazo group in the unit molecular structure | 6.4 | 6.0 | 6.7 | 4.0 | 4.6 |
| number-average molecular weight of the polyurethane portion | 3200 | 3000 | 3300 | 4500 | 2500 |

TABLE 2

| | REFERENCE EXAMPLES | | | |
|---|---|---|---|---|
| | 6 | 7 | 8 | 9 |
| Polymerization Solvents | | | | |
| cyclohexanone | 500 | 450 | 500 | 700 |
| toluene | 150 | | 100 | |
| xylene | | 100 | | |
| dimethyl formamide | 50 | | 100 | |
| Monomers | | | | |
| Styrene | 180 | 200 | 100 | 100 |
| methyl methacrylane | 550 | 200 | 500 | 600 |
| n-butyl methacrylate | | 100 | | |
| 2-ethylhexyl methacrylate | | 150 | 110 | 70 |
| 2-hydroxyethyl methacrylate | 50 | 50 | 50 | |
| dimethyl aminoethyl methacrylate | | | | 20 |
| 2-acryloamide-2-methylpropane sulfonate | 20 | | 20 | |
| methacrylic acid | | | 20 | 10 |
| mono (2-methacryloyl oxyethyl) acid phosphate | | | | |
| 2-acryloamide-2-methylpropane soidum sulfonate | | | | |

TABLE 2-continued

| | | | | |
|---|---|---|---|---|
| Polymerization Initiators | | | | |
| macromolecular azo compound, prepared in reference EXAMPLE 1 | 500 | | | |
| macromolecular azo compound, prepared in reference EXAMPLE 2 | | 750 | | |
| macromolecular azo compound, prepared in reference EXAMPLE 3 | | | 500 | |
| macromolecular azo compound, prepared in reference EXAMPLE 4 | | | | 500 |
| macromolecular azo compound, prepared in reference EXAMPLE 5 | | | | |
| azobisisobutylonitrile | | | | |
| t-butyl peroctate | | | | |
| Polymerization Temperature (°C.) | 80 | 80 | 80 | 80 |
| Properties | | | | |
| non-volatiles (%) | 50 | 50 | 50 | 50 |
| viscosity (Gardner) | Y | Y-Z | Z-Z1 | Z2 |
| number-average molecular weight | 22000 | 21000 | 21500 | 23500 |

| | REFERENCE EXAMPLES | | | |
|---|---|---|---|---|
| | 10 | 11 | 12 | 13 |
| Polymerization Solvents | | | | |
| cyclohexanone | 300 | 500 | 500 | 500 |
| toluene | | 100 | | 150 |
| xylene | | | 100 | |
| dimethyl formamide | 100 | 100 | 100 | 50 |
| Monomers | | | | |
| styrene | 100 | 200 | 100 | |
| methyl methacrylane | 470 | 450 | 300 | 550 |
| n-butyl methacrylate | | | 280 | 180 |
| 2-ethylhexyl methacrylate | | 100 | | |
| 2-hydroxyethyl methacrylate | | 50 | 100 | 50 |
| dimethyl aminoethyl methacrylate | | | | |
| 2-acryloamide-2-methylpropane sulfonate | 30 | | | |
| methacrylic acid | | | | 20 |
| 2-acryloamide-2-methylpropane soidum sulfonate | | 20 | 20 | |
| Initiators | | | | |
| macromolecular azo compound, prepared in REFERENCE EXAMPLE 1 | | 250 | | 500 |
| macromolecular azo compound, prepared in REFERENCE EXAMPLE 2 | | 250 | | |
| macromolecular azo compound, prepared in REFERENCE EXAMPLE 3 | | | 500 | |
| macromolecular azo compound, prepared in REFERENCE EXAMPLE 4 | 1000 | | | |
| macromolecular azo compound, prepared in REFERENCE EXAMPLE 5 | | | 5 | |
| azobisisobutylonitrile | | | 5 | |
| t-butyl peroctate | | | | |
| Polymerization Temperature (°C.) | 80 | 80 | 80 | 80 |
| Properties | | | | |
| non-volatiles (%) | 50 | 50 | 50 | 50 |
| viscosity (Gardner) | X-Z | Z | Y-Z | Y |
| number-average molecular weight | 19000 | 22500 | 20000 | 21000 |

TABLE 3

| | EXAMPLES | | | | |
|---|---|---|---|---|---|
| | 1 | 2 | 3 | 4 | 5 |

TABLE 3-continued

| Resin | | | | | |
|---|---|---|---|---|---|
| resin, prepared in REFERENCE EXAMPLE 6 | 100 | | | | |
| resin, prepared in REFERENCE EXAMPLE 7 | | 50 | | | |
| resin, prepared in REFERENCE EXAMPLE 8 | | | 70 | | |
| resin, prepared in REFERENCE EXAMPLE 9 | | | | 60 | |
| resin, prepared in REFERENCE EXAMPLE 10 | | | | | 45 |
| resin, prepared in REFERENCE EXAMPLE 11 | | | | | |
| resin, prepared in REFERENCE EXAMPLE 12 | | | | | |
| resin, prepared in REFERENCE EXAMPLE 13 | | | | | |
| resin, prepared in REFERENCE EXAMPLE 14 | | | | | |
| resin, prepared in REFERENCE EXAMPLE 15 | | 50 | | 40 | |
| resin, prepared in REFERENCE EXAMPLE 16 | | | 10 | | 55 |
| methylethylketone | 738 | 500 | 500 | 550 | 400 |
| cyclohexanone | | 238 | 248 | 188 | 338 |
| VAGH (Note 1) | | | 10 | | |
| magnetic powder of Fe-Ni alloy | 250 | 250 | 250 | 250 | 250 |
| carbon black | 8.6 | 8.6 | 8.6 | 8.6 | 8.6 |
| lubricant | 3.5 | 3.5 | 3.5 | 3.5 | 3.5 |
| Burnock D-750 (Note 2) | 14.3 | 14.3 | 14.3 | 14.3 | 14.3 |
| Properties | | | | | |
| brightness (45°) | 100 | 117 | 112 | 108 | 118 |
| resistance to hydrothermal conditions | A | A-B | A | A-B | A |
| surface smoothness | Good | Good | Good | Good | Good |
| resistance to wear | 650 | 620 | 665 | 625 | 600 |
| Squareness ratio (Br/Bm) | 0.85 | 0.84 | 0.84 | 0.83 | 0.86 |

| | EXAMPLES | | | |
|---|---|---|---|---|
| | 6 | 7 | 8 | 9 |
| Resin | | | | |
| resin, prepared in REFERENCE EXAMPLE 6 | | | | |
| resin, prepared in REFERENCE EXAMPLE 7 | | | | |
| resin, prepared in REFERENCE EXAMPLE 8 | | | | |
| resin, prepared in REFERENCE EXAMPLE 9 | 50 | | | |
| resin, prepared in REFERENCE EXAMPLE 10 | | | | |
| resin, prepared in REFERENCE EXAMPLE 11 | 80 | | | |
| resin, prepared in REFERENCE EXAMPLE 12 | | 20 | | |
| resin, prepared in REFERENCE EXAMPLE 13 | | | 100 | |
| resin, prepared in REFERENCE EXAMPLE 14 | | | | |
| resin, prepared in REFERENCE EXAMPLE 15 | 10 | | | |
| resin, prepared in REFERENCE EXAMPLE 16 | 10 | 30 | | 100 |
| methylethylketone | 500 | 738 | 738 | 738 |
| cyclohexanone | 238 | | | |
| VAGH | | | | |
| magnetic powder of Fe-Ni alloy | 250 | 250 | 250 | 250 |
| carbon black | 8.6 | 8.6 | 8.6 | 8.6 |
| lubricant | 3.5 | 3.5 | 3.5 | 3.5 |
| Burnock D-750 | 14.3 | 14.3 | 14.3 | 14.3 |
| Properties | | | | |
| brightness (45°) | 115 | 109 | 110 | 112 |
| resistance to hydrothermal conditions | A-B | A | A | A |
| surface smoothness | Good | Good | Good | Good |
| resistance to wear | 650 | 620 | 665 | 625 |
| Squareness ratio (Br/Bm) | 0.86 | 0.83 | 0.85 | 0.84 |

| | EXAMPLES | | | | |
|---|---|---|---|---|---|
| | 10 | 11 | 12 | 13 | 14 |
| Resin | | | | | |
| resin, prepared in REFERENCE EXAMPLE 15 | | | 30 | | |
| resin, prepared in REFERENCE EXAMPLE 16 | | | | | 40 |
| resin, prepared in REFERENCE EXAMPLE 20 | 100 | | | | |
| resin, prepared in REFERENCE EXAMPLE 21 | | 100 | | | |
| resin, prepared in REFERENCE EXAMPLE 22 | | | 70 | | |
| resin, prepared in REFERENCE EXAMPLE 23 | | | | 50 | |
| resin, prepared in REFERENCE EXAMPLE 24 | | | | | 30 |
| methylethylketone | 738 | 500 | 500 | 550 | 400 |
| cyclohexanone | | 238 | 248 | 238 | 368 |
| VAGH (Note 1) | | | 10 | | |
| magnetic powder of Fe-Ni alloy | 250 | 250 | 250 | 250 | 250 |
| carbon black | 8.6 | 8.6 | 8.6 | 8.6 | 8.6 |
| lubricant | 3.5 | 3.5 | 3.5 | 3.5 | 3.5 |
| Burnock D-750 (Note 2) | 14.3 | 14.3 | 14.3 | 14.3 | 14.3 |
| Properties | | | | | |
| brightness (45°) | 118 | 120 | 115 | 117 | 119 |
| resistance to hydrothermal conditions | A | A | A | A-B | A |
| surface smoothness | Good | Good | Good | Good | Good |
| resistance to wear | 670 | 655 | 680 | 620 | 700 |
| Squareness ratio (Br/Bm) | 0.86 | 0.89 | 0.88 | 0.86 | 0.87 |

| | EXAMPLES | | COMPARATIVE EXAMPLES | |
|---|---|---|---|---|
| | 15 | 16 | 1 | 2 |
| Resin | | | | |
| resin, prepared in REFERENCE EXAMPLE 15 | | 40 | 40 | |
| resin, prepared in REFERENCE EXAMPLE 16 | | | | 40 |
| resin, prepared in REFERENCE EXAMPLE 20 | | | | |
| resin, prepared in REFERENCE EXAMPLE 21 | 100 | | | |
| resin, prepared in REFERENCE EXAMPLE 22 | | 60 | | |
| resin, prepared in REFERENCE EXAMPLE 23 | | | | |
| resin, prepared in REFERENCE EXAMPLE 24 | | | | |
| methylethylketone | 500 | 738 | 468 | 500 |
| cyclohexanone | 238 | | 300 | 268 |
| VAGH | | | 30 | 30 |
| magnetic powder of Fe-Ni alloy | 250 | 250 | 250 | 250 |
| carbon black | 8.6 | 8.6 | 8.6 | 8.6 |
| lubricant | 3.5 | 3.5 | 3.5 | 3.5 |
| Burnock D-750 | | | 14.3 | 14.3 |
| Properties | | | | |

TABLE 3-continued

| brightness (45°) | 105 | 107 | 99 | 78 |
| resistance to hydrothermal conditions | A-B | A-B | B-C | B-C |
| surface smoothness | Good | Good | Bad | Bad |
| resistance to wear | 540 | 590 | 460 | 420 |
| Squareness ratio (Br/Bm) | 0.88 | 0.85 | 0.72 | 0.70 |

(Note 1) Vinyl chloride/vinyl acetate copolymer, supplied by Union Carbide
(Note 2) Polyisocyanate resin, supplied by Dainippon Ink

What is claimed is:

1. A magnetic paint comprising, a block copolymer and magnetic powder, said block copolymer comprising a polyurethane segment and vinyl polymer segment.

2. A magnetic paint, as defined in claim 1, further comprising polyurethane.

3. A magnetic paint, as defined in claim 1, further comprising polyisocyanate.

4. A magnetic paint, as defined in claim 2, further comprising polyisocyanate.

5. A magnetic paint as claimed in claim 1, wherein said block copolymer having a polyurethane segment and vinyl polymer segment includes at least one functional group selected from the group consisting of a sulfonic group, sulfonate group, carboxyl group, carboxylate group, phosphoric group, phosphate group, phosphorous group, phosphite group, hypophosphorous group and hypophosphite group.

6. A magnetic paint as claimed in claim 5, wherein each said sulfonate group, carboxylate group, phosphate group, phosphite group and hypophosphite group is at least one salt selected from the group consisting of alkaline metal salt, amine salt and quaternary ammonium salt.

7. A magnetic paint as claimed in claim 1, wherein said block copolymer having a polyurethane segment and vinyl polymer segment includes a hydroxyl group.

8. A magnetic paint as claimed in claim 1, wherein said block copolymer having a polyurethane segment and vinyl polymer segment is prepared by polymerizing at least one type of polymerizable unsaturated monomer in the presence of a macromolecular azo compound as the polymerization initiator, said macromolecular azo compound having at least one azo group and at least two urethane bonds in its unit molecular structure.

9. A magnetic paint as claimed in claim 1, wherein said block copolymer having a polyurethane segment and vinyl polymer segment is prepared by reacting a vinyl polymer with polyurethane, said vinyl polymer having, at one or both of its ends, at least one type of functional group selected from a group consisting of hydroxyl, isocyanate, mercapto, carboxyl, epoxy, amino and chlorocarbonyl groups, and said polyurethane having, at one or both of its ends, a functional group that can react with said functional group present at one or both ends of said vinyl polymer.

10. A magnetic paint as claimed in claim 1, wherein said block copolymer having a polyurethane segment and vinyl polymer segment is prepared by reacting a vinyl polymer with diol and diisocyanate compounds, said vinyl polymer having, at one or both of its ends, at least one type of functional group selected from a group consisting of hydroxyl, isocyanate, mercapto, carboxyl, epoxy, amino and chlorocarbonyl groups.

11. A magnetic paint as claimed in claim 1, wherein said block copolymer having a polyurethane segment and vinyl polymer segment is prepared by polymerizing at least one type of polymerizable unsaturated monomer in the presence of polymeric peroxide as the polymerization initiator, said polymeric peroxide having at least one peroxygen group and at least two urethane bonds in its unit molecular structure.

12. A magnetic paint as claimed in claim 1, wherein said block copolymer having a polyurethane segment and vinyl polymer segment is prepared by the reactions of polyurethane, said polyurethane having a group that can react with polymer anions produced by anionic polymerization to form a bond.

13. A magnetic paint as claimed in claim 1, wherein said block copolymer having a polyurethane segment and vinyl polymer segment is prepared by the reactions of polyurethane, said polyurethane having a group that can react with polymer cations produced by cationic polymerization to form a bond.

14. A magnetic paint as claimed in claim 8, wherein said block copolymer having a polyurethane segment and vinyl polymer segment is prepared by polymerizing at least one polymerizable unsaturated monomer in the presence of a reactive compound which has, in its unit molecular structure, at least one structural unit represented by the general formula:

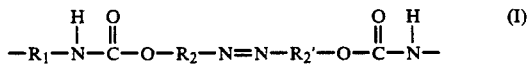

where, $R_1$ stands for an alkylene group, a cyclic alkylene group, an alkylene group having an ester group, a benzene ring or an alkylene group containing a benzene ring, and $R_2$ and $R_2'$, which may be the same or different, for an alkylene group, an alkylene group containing a cyano group, an alkylene group containing an amide bond or an alkylene group containing an amide bond and a hydroxyl group and one structural unit represented by the general formula:

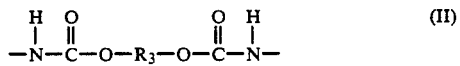

where, $R_3$ stands for polyol group residue.

15. A magnetic paint as claimed in claim 14, wherein said reactive compound having, in its unit molecular structure, at least one structural unit represented by the general formula:

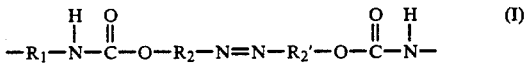

where, $R_1$ stands for an alkylene group, a cyclic alkylene group, an alkylene group having an ester group, a benzene ring or an alkylene group containing a benzene ring, and $R_2$ and $R_2'$, which may be the same or different, for an alkylene group, an alkylene group containing a cyano group, an alkylene group containing an amide bond or an alkylene group containing an amide bond and a hydroxyl group and one structural unit represented by the general formula:

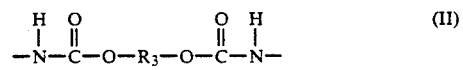

where, $R_3$ stands for polyol group residue has at least one group selected from a group consisting of a sulfonic group, sulfonate group, carboxyl group, carboxylate group, phosphoric group, phosphate group, phosphorus group, phosphite group, hypophosphorous group and hypophosphite group.

16. A magnetic paint as claimed in claim 14, wherein the at least one polymerizable unsaturated monomer includes at least one polymerizable unsaturated monomer having at least one group selected from a group consisting of a sulfonic group, sulfonate group, carboxyl group, carboxylate group, phosphoric group, phosphate group, phosphorous group, phosphite group, hypophosphorous group and hypophosphite group.

17. A magnetic paint as claimed by claim 14, wherein the reactive compound has a number-average molecular weight of 1,500 to 50,000 and said block copolymer having a polyurethane segment and vinyl polymer segment is prepared by polymerizing 98 to 5 weight parts of at least one type of polymerizable unsaturated monomer in the presence of 2 to 95 weight parts of the reactive compound.

18. A magnetic paint as claimed in claim 17, wherein the at least one polymerizable unsaturated monomer includes at least one polymerizable unsaturated monomer having at least one group selected from a group consisting of a sulfonic group, sulfonate group, carboxyl group, carboxylate group, phosphoric group, phosphate group, phosphorous group, phosphite group, hypophosphorous group and hypophosphite group.

19. A magnetic recording medium comprising a substrate and a magnetic layer disposed on the substrate, wherein the magnetic layer is formed by applying a magnetic paint to the substrate and drying the magnetic paint, the magnetic paint comprising a magnetic powder and a block copolymer, the block copolymer comprising a polyurethane segment and a vinyl polymer segment.

20. A magnetic recording medium as defined in claim 19, wherein the magnetic paint further comprises a polyurethane.

21. A magnetic recording medium as defined in claim 19, wherein the magnetic paint further comprises a polyisocyanate.

22. A magnetic recording medium as defined in claim 20, wherein the magnetic paint further comprises a polyisocyanate.

23. A magnetic recording medium as defined in claim 19, wherein the block copolymer having a polyurethane segment and a vinyl polymer segment includes at least one functional group selected from the group consisting of a sulfonic group, a sulfonate group, a carboxyl group, a carboxylate group, a phosphoric group, a phosphate group, a phosphorous group, a phosphite group, a hypophosphorus group, and a hypophosphite group.

24. A magnetic recording medium as defined in claim 23, wherein each of the sulfonic group, carboxylate group, phosphate group, phosphite group, and hypophosphite group is at least one salt selected from the group consisting of alkaline metal salt, amine salt, and quaternary ammonium salt.

25. A magnetic recording medium as defined in claim 19, wherein the block copolymer having a polyurethane group segment and a vinyl polymer segment includes a hydroxyl group.

* * * * *